(12) United States Patent
Okubo et al.

(10) Patent No.: US 12,552,364 B2
(45) Date of Patent: Feb. 17, 2026

(54) VEHICLE TURNING CONTROL DEVICE

(71) Applicant: Honda Motor Co., Ltd., Tokyo (JP)

(72) Inventors: Naoto Okubo, Tokyo (JP); Ryo Koyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 18/299,073

(22) Filed: Apr. 12, 2023

(65) Prior Publication Data

US 2023/0391317 A1 Dec. 7, 2023

(30) Foreign Application Priority Data

Jun. 2, 2022 (CN) .......................... 202210622715.5

(51) Int. Cl.
*B60W 30/045* (2012.01)
*B60W 40/114* (2012.01)

(52) U.S. Cl.
CPC ........ *B60W 30/045* (2013.01); *B60W 40/114* (2013.01); *B60W 2520/10* (2013.01); *B60W 2520/14* (2013.01); *B60W 2720/10* (2013.01); *B60W 2720/14* (2013.01)

(58) Field of Classification Search
CPC ............. B60W 30/045; B60W 40/114; B60W 2520/10; B60W 2520/14; B60W 2720/10; B60W 2720/14
See application file for complete search history.

(56) References Cited

U.S. PATENT DOCUMENTS

| 5,957,987 | A | * | 9/1999 | Sudo | B60T 8/1755 303/146 |
|---|---|---|---|---|---|
| 2007/0184929 | A1 | * | 8/2007 | Piyabongkarn | F16H 48/08 475/84 |
| 2010/0114449 | A1 | * | 5/2010 | Shiozawa | B62D 6/005 701/90 |
| 2017/0057540 | A1 | * | 3/2017 | Anma | B62D 5/0463 |
| 2017/0080969 | A1 | * | 3/2017 | Ieyasu | B62D 5/0463 |
| 2018/0111642 | A1 | * | 4/2018 | Endo | B62D 6/008 |
| 2019/0241176 | A1 | * | 8/2019 | Suzuki | B60L 15/20 |
| 2020/0331472 | A1 | * | 10/2020 | Ohmura | B60W 40/103 |
| 2021/0102810 | A1 | * | 4/2021 | Zhang | G07C 5/02 |

FOREIGN PATENT DOCUMENTS

JP 2017065486 4/2017

* cited by examiner

*Primary Examiner* — Mohamad O El Sayah
(74) *Attorney, Agent, or Firm* — JCIPRNET

(57) ABSTRACT

Disclosed is a vehicle turning control device, which includes an operation state detection device, a vehicle speed detection device, and a target yaw moment calculation device. In the target yaw moment calculation device, the yaw moment of inertia calculation means calculates the yaw moment of inertia based on the vehicle speed when the vehicle turns. The yaw damping calculation means calculates yaw damping based on the vehicle speed when the vehicle turns. The lateral deviation angular velocity calculation means calculates the lateral deviation angular velocity based on the yaw moment of inertia and yaw damping. The target yaw moment calculation means calculates a target yaw moment of the vehicle based on the lateral deviation angular velocity. The yaw moment of inertia calculation means calculates the yaw moment of inertia based on the first correction amount. The yaw damping calculation means calculates yaw damping based on the second correction amount.

6 Claims, 4 Drawing Sheets

VEHICLE TURNING CONTROL DEVICE

CROSS-REFERENCE TO RELATED APPLICATION

This application claims the priority benefit of China application no. 202210622715.5, filed on Jun. 2, 2022. The entirety of the above-mentioned patent application is hereby incorporated by reference herein and made a part of this specification.

BACKGROUND

Technical Field

The invention relates to a control device, in particular to a vehicle turning control device.

Description of Related Art

In recent years, active efforts have been made to provide access to sustainable transport systems that also take into account vulnerable persons such as the elderly or children among traffic participants. In order to achieve the above purpose, research and development have been conducted through development related to vehicle behavior stability to further improve traffic safety and convenience.

When a vehicle turns or is disturbed, it is necessary to control the posture of the vehicle body so that the vehicle can run stably. The current technology is to calculate the target yaw moment based on the vehicle speed and steering speed, and add the yaw moment to the vehicle for control to improve yaw followability.

However, in the current technology, although it is possible to improve the followability of the yaw response, it is difficult to improve the yaw damping performance simultaneously.

To improve the driving stability of a vehicle, how to simultaneously solve the problems of followability of yaw response at the time of vehicle turning and yaw damping performance is to be overcome by practitioners in the field.

In view of the above, in order to solve the above-mentioned problems, the present invention aims at improving the followability of yaw response at the time of vehicle turning while also improving the yaw damping performance. In this way, the present invention facilitates to contribute to the development of sustainable transportation systems.

SUMMARY

In order to achieve the above purpose, the present invention is a vehicle turning control device. The vehicle turning control device includes an operation state detection device, a vehicle speed detection device, and a target yaw moment calculation device. The operation state detection device detects the amount of operation state of the driver's vehicle. The vehicle speed detection device detects the vehicle speed of the vehicle. The target yaw moment calculation device calculates the target yaw moment of the vehicle based on the amount of operation state and the vehicle speed. The target yaw moment calculation device includes a yaw moment of inertia calculation means, a yaw damping calculation means, a lateral deviation angular velocity calculation means, and a target yaw moment calculation means. The yaw moment of inertia calculation means calculates the yaw moment of inertia based on the vehicle speed detected by the vehicle speed detection device when the vehicle turns. The yaw damping calculation means calculates yaw damping based on the vehicle speed detected by the vehicle speed detection device when the vehicle turns. The lateral deviation angular velocity calculation means calculates the lateral deviation angular velocity based on the yaw moment of inertia and yaw damping. The target yaw moment calculation means calculates a target yaw moment of the vehicle based on the lateral deviation angular velocity. The yaw moment of inertia calculation means calculates the yaw moment of inertia based on the first correction amount of the vehicle speed detected by the vehicle speed detection device. The yaw damping calculation means calculates yaw damping based on the second correction amount of the vehicle speed detected by the vehicle speed detection device.

In order to make the above-mentioned features and advantages of the present invention more comprehensible, the following specific embodiments are described in detail with accompanying drawings.

DESCRIPTION OF THE EMBODIMENTS

Figure 1:
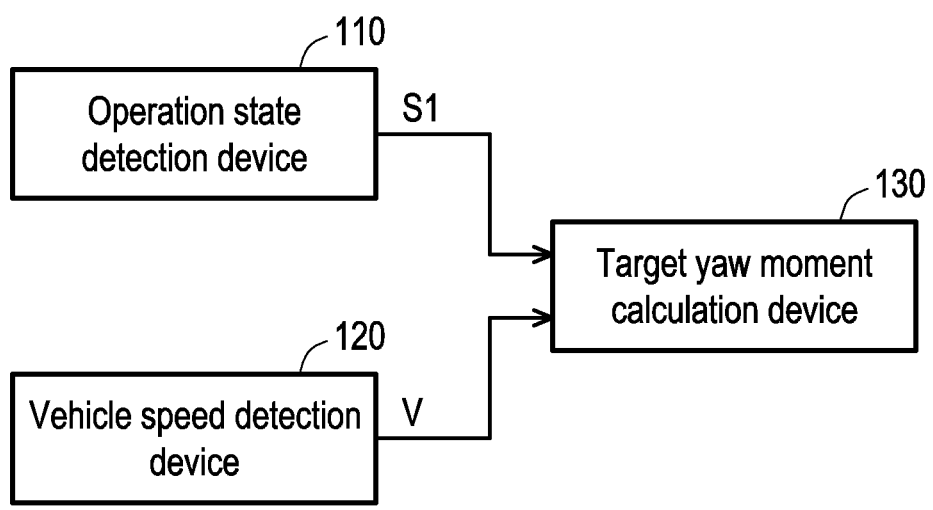
FIG. 1 shows a schematic block diagram of a vehicle turning control device according to an embodiment of the present invention.

Reference will now be made in detail to the exemplary embodiments of the present disclosure, examples of which are illustrated in the accompanying drawings. Wherever possible, the same reference numbers will be used in the drawings and description to refer to the same or like parts.

Based on the structure, the target yaw moment at the time of vehicle turning is calculated based on the yaw moment of inertia for target behavior calculation and the lateral deviation angular velocity of yaw damping for target behavior calculation, thereby improving the responsiveness at the time of vehicle turning while improving yaw followability. Target yaw moment with good yaw damping characteristics may be calculated even at high vehicle speeds. In particular, the yaw moment of inertia for target behavior calculation and yaw damping for target behavior calculation are calculated using various correction amounts appropriately set according to the vehicle speed, so that it is possible to calculate an appropriate target yaw moment according to the driving condition of the vehicle.

In an embodiment of the present invention, the first correction amount is set to be a first predetermined value when the vehicle speed is less than the first threshold value, and the first correction amount is set to be a second predetermined value less than the first predetermined value when the vehicle speed is greater than the first threshold value.

Based on the above configuration, by calculating the target yaw moment using the first correction amount calculated based on the vehicle speed, it is possible to calculate the target yaw moment for improving the yaw followability.

In an embodiment of the present invention, the second correction amount is set to be a third predetermined value when the vehicle speed is less than the second threshold value, and the second correction amount is set to be a fourth predetermined value greater than the third predetermined value when the vehicle speed is greater than the second threshold value.

Based on the structure, by calculating the target yaw moment using the second correction amount calculated based on the vehicle speed, it is possible to calculate the target yaw moment with good yaw damping characteristics even at high vehicle speeds.

In an embodiment of the present invention, the lateral deviation angular velocity calculation means calculates the lateral deviation angular velocity using a vehicle body model whose elements are the amount of operation state, vehicle speed, yaw moment of inertia, and yaw damping. The vehicle body model is able to calculate the yaw angular acceleration based on the amount of operation state and the vehicle speed. The target yaw moment calculation means calculates the target yaw moment based on the lateral deviation angular velocity and the yaw angular acceleration.

Based on the above structure, by calculating the lateral deviation angular velocity and the yaw angular acceleration using the vehicle body model, and calculating the target yaw moment based on the lateral deviation angular velocity and the yaw angular acceleration, it is possible to improve the responsiveness at the time of vehicle turning while increasing yaw followability. It is also possible to calculate the target yaw moment with good yaw damping characteristics even at high vehicle speeds.

Based on the above, the vehicle turning control device of the present invention improves the responsiveness at the time of vehicle turning while improving the yaw followability. It is also possible to calculate the target yaw moment with good yaw damping characteristics even at high vehicle speeds. In the yaw rate feedforward control for improving the yaw motion based on the vehicle body model, the yaw damping performance is improved by adding the yaw moment, which is calculated by using the yaw damping coefficient for improving the yaw damping performance and the lateral deviation angular velocity of the vehicle body.

FIG. 1 shows a schematic block diagram of a vehicle turning control device according to an embodiment of the present invention. Please refer to FIG. 1, the vehicle turning control device 100 is configured in a vehicle, for example, to control the travel of the vehicle. In the present embodiment, the vehicle includes, for example, an automobile powered by an internal combustion engine such as a diesel engine or a gasoline engine, an electric vehicle powered by an electric motor, a hybrid automobile having both an internal combustion engine and an electric motor, and the like.

As shown in FIG. 1, the vehicle turning control device 100 includes an operation state detection device 110, a vehicle speed detection device 120 and a target yaw moment calculation device 130. The operation state detection device 110 may be configured to detect the amount of operation state S1 of the driver's vehicle. The operation state detection device 110 is, for example, a steering angle sensor, and in this embodiment, the amount of operation state S1 is, for example, a steering angle. The operation state detection device 110 may transmit the detected amount of operation state S1 to the target yaw moment calculation device 130.

The vehicle speed detection device 120 is, for example, a vehicle speed sensor, which may be configured to detect the vehicle speed V of the vehicle. The vehicle speed detection device 120 may transmit the detected vehicle speed V to the target yaw moment calculation device 130.

The target yaw moment calculation device 130 may calculate the target yaw moment Mz of the vehicle based on the amount of operation state S1 and the vehicle speed V. The constituent elements and control method of the target yaw moment calculation device 130 will be described below.

Figure 2:
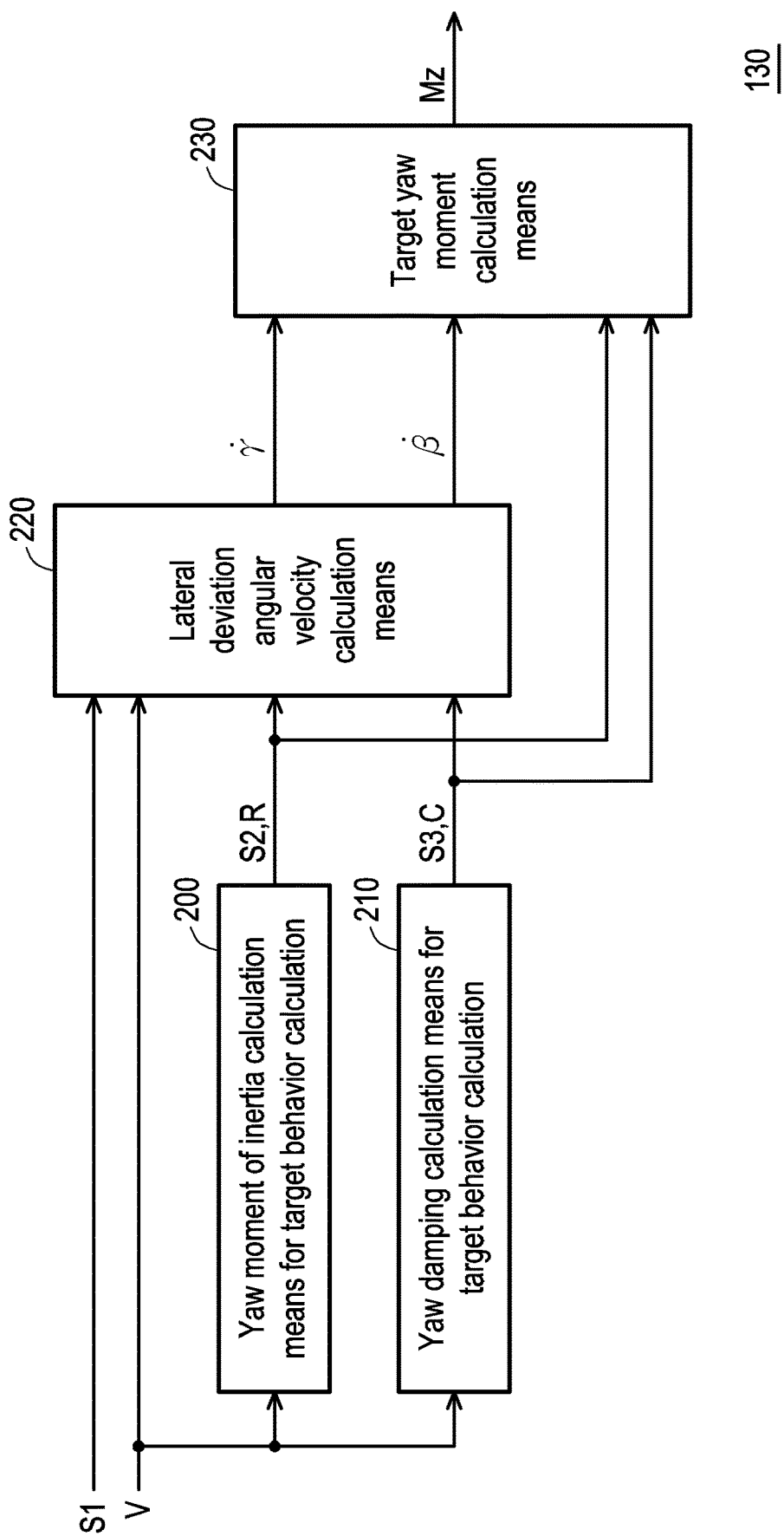
FIG. 2 shows a schematic block diagram of a target yaw moment calculation device according to an embodiment of the present invention.

FIG. 2 shows a schematic block diagram of a target yaw moment calculation device according to an embodiment of the present invention. Referring to FIG. 2, the target yaw moment calculation device 130 includes a yaw moment of inertia calculation means 200 for target behavior calculation, a yaw damping calculation means 210 for target behavior calculation, a lateral deviation angular velocity calculation means 220 and a target yaw moment calculation means 230. Part or all of the target yaw moment calculation device 130 may be implemented by a processor executing a program (software). Moreover, some or all of them may also be implemented by hardware such as a large scale integration (LSI) circuit or an application specific integrated circuit (ASIC), and may also be implemented by a combination of software and hardware.

The yaw moment of inertia calculation means 200 for target behavior calculation may calculate the yaw moment of inertia S2 for target behavior calculation based on the vehicle speed V detected by the vehicle speed detection device 120 at the time of vehicle turning. Specifically, the yaw moment of inertia calculation means 200 for target behavior calculation may calculate the yaw moment of inertia S2 for target behavior calculation based on a first correction amount R of the vehicle speed V detected by the vehicle speed detection device 120. The first correction amount R is set to be a first predetermined value when the vehicle speed V is less than the first threshold value, and the first correction amount R is set to be a second predetermined value less than the first predetermined value when the vehicle speed V is greater than the first threshold value. In this embodiment, the first correction amount R is, for example, a yaw inertial momentum multiplier. The first threshold is, for example, 20 kph, the first predetermined value is, for example, 1, and the second predetermined value is, for example, 0.9, but the present invention is not limited thereto.

The yaw damping calculation means 210 for target behavior calculation may calculate the yaw damping S3 for target behavior calculation based on the vehicle speed V detected by the vehicle speed detection device 120 at the time of vehicle turning. Specifically, the yaw damping calculation means 210 for target behavior calculation may calculate the yaw damping S3 for target behavior calculation based on a second correction amount C based on the vehicle speed V detected by the vehicle speed detection device 120. The second correction amount C is set to be a third predetermined value when the vehicle speed V is less than the second threshold value, and is set to be a fourth predetermined value greater than the third predetermined value when the vehicle speed V is greater than the second threshold value. In this embodiment, the second correction amount C is, for example, a yaw damping coefficient. The second threshold is, for example, 80 kph, the third predetermined value is, for example, 0, and the fourth predetermined value is, for example, 500, but the present invention is not limited thereto.

The lateral deviation angular velocity calculation means 220 may receive the amount of operation state S1, the vehicle speed V, the yaw moment of inertia S2 for target behavior calculation, and the yaw damping S3 for target behavior calculation, and calculate the lateral deviation angular velocity $\dot{\beta}$ based on the yaw moment of inertia S2 for target behavior calculation and the yaw damping S3 for target behavior calculation. Specifically, the lateral deviation angular velocity calculation means 220 may calculate the lateral deviation angular velocity $\dot{\beta}$ by using a vehicle body model whose elements are the amount of operation state S1, the vehicle speed V, the yaw moment of inertia S2 for the target behavior calculation, and the yaw damping S3 for the target behavior calculation. The vehicle body model may use corresponding vehicle motion equations to calculate performance values related to vehicle motion. The vehicle body model may further calculate the yaw angular acceleration $\dot{\gamma}$ based on the amount of operation state S1 and the vehicle speed V.

For example, the lateral deviation angular velocity $\dot{\beta}$ may satisfy the following calculation formula:

$$\dot{\beta} = \frac{1}{mV}\left[-2(K_f + K_r)\beta - \left\{mV + \frac{2}{V}(l_f K_f - l_r K_r)\right\}r + 2K_f\delta\right]$$

The yaw angular acceleration $\dot{\gamma}$ may satisfy the following calculation formula:

$$\dot{r} = \frac{1}{RI}\left[C\dot{\beta} - 2(l_f K_f - l_r K_r)\beta - \frac{2}{V}(l_f^2 K_f + l_r^2 K_r)r + 2l_f K_f\delta\right]$$

In the formula, m is the weight of the vehicle, V is the vehicle speed, $K_f$ is the equivalent cornering power (front wheels), $K_r$ is the equivalent cornering power (rear wheels), β is the lateral deviation angle of the vehicle body, $I_f$ is the distance from the center of gravity of the vehicle to the center of the front wheel, $I_r$ is the distance from the center of gravity of the vehicle to the center of the rear wheel, δ is the tire rudder angle (front wheel rudder angle), I is the yaw moment of inertia of the actual vehicle, R is the first correction amount, and C is the second correction amount.

The target yaw moment calculation means 230 may calculate the target yaw moment Mz of the vehicle based on the lateral deviation angular velocity $\dot{\beta}$. Specifically, the target yaw moment calculation means 230 may receive the lateral deviation angular velocity $\dot{\beta}$ and the yaw angular acceleration $\dot{\gamma}$, and calculate the target yaw moment Mz based on the lateral deviation angular velocity $\dot{\beta}$ and the yaw angular acceleration $\dot{\gamma}$. For example, the target yaw moment calculation means 230 may further obtain the first correction amount R and the second correction amount C from the yaw moment of inertia calculation means 200 for the target behavior calculation and the yaw damping calculation means 210 for the target behavior calculation, and the target yaw moment Mz may be calculated by the following calculation formula.

$$Mz=(1-R)I\dot{r}+C\dot{\beta}$$

It should be noted that although the formulas for calculating the lateral deviation angular velocity $\dot{\beta}$ the yaw angular acceleration $\dot{\gamma}$, and the target yaw moment Mz are exemplified in the above-mentioned embodiments, the actual calculation method is not limited thereto, and designers in the field may make appropriate adjustments according to actual situation.

In this way, by adding an element proportional to vehicle body lateral deviation angular velocity capable of adjusting yaw damping characteristics to the vehicle body model that calculates the target behavior, it is possible to generate the target behavior with good yaw damping characteristics even at high vehicle speeds. By calculating the yaw moment required to be added for achieving the target behavior with good yaw damping characteristics according to the above added elements and the target behavior, and adding the calculated yaw moment to the vehicle, it is possible to improve the followability of the yaw response at the time of vehicle turning while enhancing the yaw damping performance.

Figure 3:
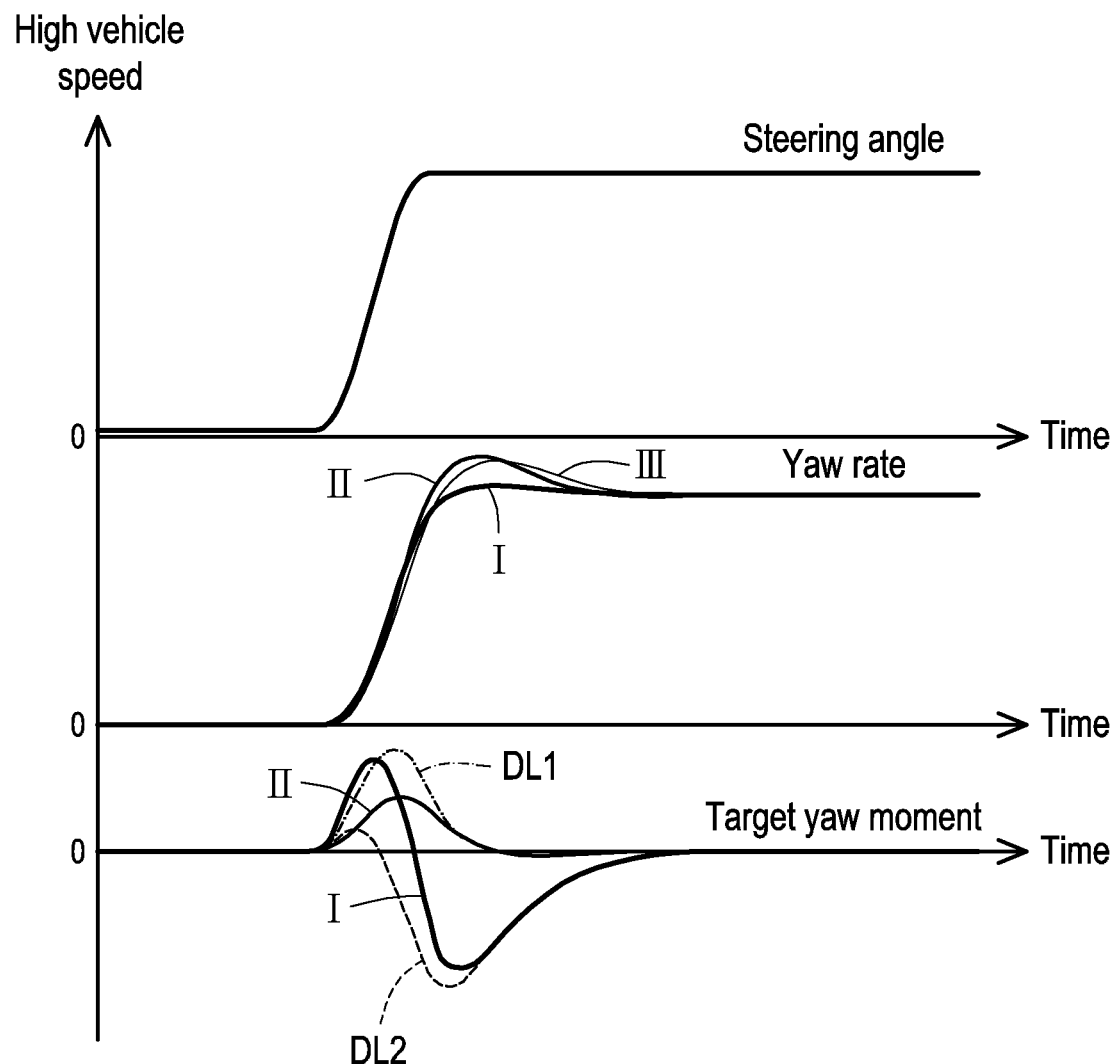
FIG. 3 shows a schematic diagram of control results in the embodiments of the present invention and the related art.

FIG. 3 shows a schematic diagram of control results in the embodiments of the present invention and the related art. As shown in FIG. 3, among the curves denoting steering angle, yaw rate, and target yaw moment Mz, curve I is the result of performing the control method of this embodiment, curve II is the result of performing the control method of the related art, and curve III is the result of performing no control.

In terms of yaw rate, when no control is performed, it can be seen from curve III that the yaw rate increases after the steering angle is generated and gradually decreases to a steady state after reaching the highest point. Under the control mode of the related art, curve II reaches the highest point faster than curve III, and the highest point is higher as compared to curve III, but the speed of decreasing to the steady state is also faster. According to the control method of this embodiment, it can be clearly seen from the curve I that the highest point of the yaw rate of this embodiment is quite close to the steady state, and the steady state may be reached in a short time. In view of the above, the control method of this embodiment significantly improves the yaw damping performance.

In terms of target yaw moment Mz, under the control method of the related art, the change of curve II is minor, and the yaw followability is low. Based on the control method of the present embodiment, it can be clearly seen from the curve I that the change of the target yaw moment Mz of the present embodiment is more obvious and the yaw followability is high. The dashed lines DL1 and DL2 indicate the improvement of the yaw followability of this embodiment. In view of the above, the control method of this embodiment significantly improves the yaw followability.

Next, the method of setting the first correction amount R and the second correction amount C are described.

Figure 4:
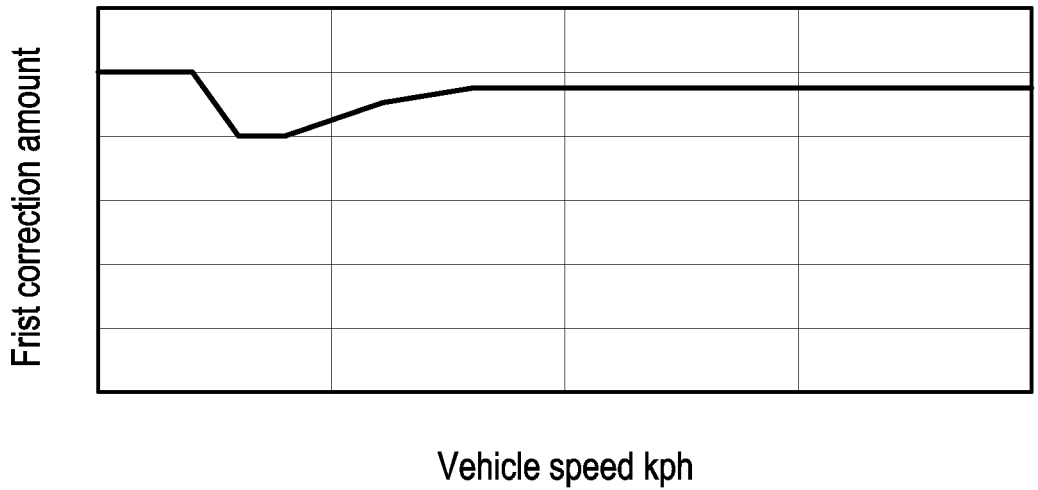
FIG. 4 shows a method of setting the first correction amount according to an embodiment of the present invention.

FIG. 4 shows a method of setting the first correction amount according to an embodiment of the present invention. As shown in FIG. 4, the first correction amount R is set to be higher during low vehicle speed, and the first correction amount R is decreased when the low vehicle speed is higher, and then increased along with the controlled upper limit vehicle speed.

Figure 5:
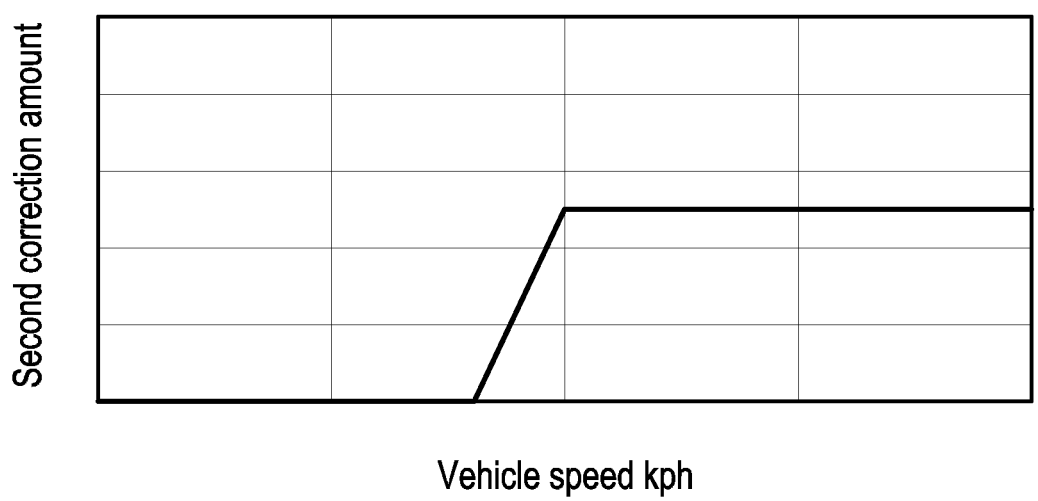
FIG. 5 shows a method of setting the second correction amount according to an embodiment of the present invention.

FIG. 5 shows a method of setting the second correction amount according to an embodiment of the present invention. As shown in FIG. 5, the second correction amount C is set in the manner that the gain is low during low vehicle speed, the gain is high in the main speed range where sufficient control is desired, and then the gain decreases along with the controlled upper limit vehicle speed.

To sum up, the vehicle turning control device of the present invention improves the responsiveness at the time of vehicle turning while improving the yaw followability. It is possible to calculate an appropriate target yaw moment with good yaw damping characteristics even at high vehicle speeds, which in turn contributes to the development of sustainable transportation systems.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A vehicle turning control device, comprising:
a steering sensor which detects a steering angle of a driver's vehicle in response to a steering wheel of the driver's vehicle having the steering angle;
a vehicle speed sensor which detects a vehicle speed of the vehicle; and
a processor coupled to the steering sensor and the steering angle and configured to:
calculate a yaw moment of inertia based on a first correction amount of the vehicle speed detected by the vehicle speed sensor when the vehicle turns;
calculate yaw damping based on a second correction amount of the vehicle speed detected by the vehicle speed sensor when the vehicle turns;
calculate a lateral deviation angular velocity based on the yaw moment of inertia and the yaw damping and the vehicle speed;
calculate the target yaw moment of the vehicle based on the lateral deviation angular velocity, the first correction amount of the vehicle speed detected by the vehicle speed sensor, and the second correction amount of the vehicle speed detected by the vehicle speed sensor; and
control the vehicle while the vehicle is turning based on the target yaw moment having been calculated.

2. The vehicle turning control device according to claim 1, wherein the first correction amount is set to be a first predetermined value when the vehicle speed is less than a first threshold value, and the first correction amount is set to be a second predetermined value less than the first predetermined value when the vehicle speed is greater than the first threshold value.

3. The vehicle turning control device according to claim 2, wherein the second correction amount is set to be a third predetermined value when the vehicle speed is less than a second threshold value, and the second correction amount is set to be a fourth predetermined value greater than the third predetermined value when the vehicle speed is greater than the second threshold value.

4. The vehicle turning control device according to claim 3, wherein the processor is configured to calculate the lateral deviation angular velocity using a vehicle body model whose elements are the steering angle, the vehicle speed, the yaw moment of inertia, and the yaw damping,
the vehicle body model is configured to calculate a yaw angular acceleration based on the steering angle and the vehicle speed, and
the processor is configured to calculate the target yaw moment based on the lateral deviation angular velocity and the yaw angular acceleration.

5. The vehicle turning control device according to claim 2, wherein the processor is configured to calculate the lateral deviation angular velocity using a vehicle body model whose elements are the steering angle, the vehicle speed, the yaw moment of inertia, and the yaw damping,
the vehicle body model is configured to calculate a yaw angular acceleration based on the steering angle and the vehicle speed, and
the processor is configured to calculate the target yaw moment based on the lateral deviation angular velocity and the yaw angular acceleration.

6. The vehicle turning control device according to claim 1, wherein the processor is configured to calculate the lateral deviation angular velocity using a vehicle body model whose elements are the steering angle, the vehicle speed, the yaw moment of inertia, and the yaw damping,
the vehicle body model is configured to calculate a yaw angular acceleration based on the steering angle and the vehicle speed, and
the processor is configured to calculate the target yaw moment based on the lateral deviation angular velocity and the yaw angular acceleration.

* * * * *